Jan. 17, 1933.  M. W. BERGER ET AL  1,894,342
ROTATING NEON ILLUMINATED UNIT FOR BARBER POLES
Filed March 8, 1932   4 Sheets-Sheet 1
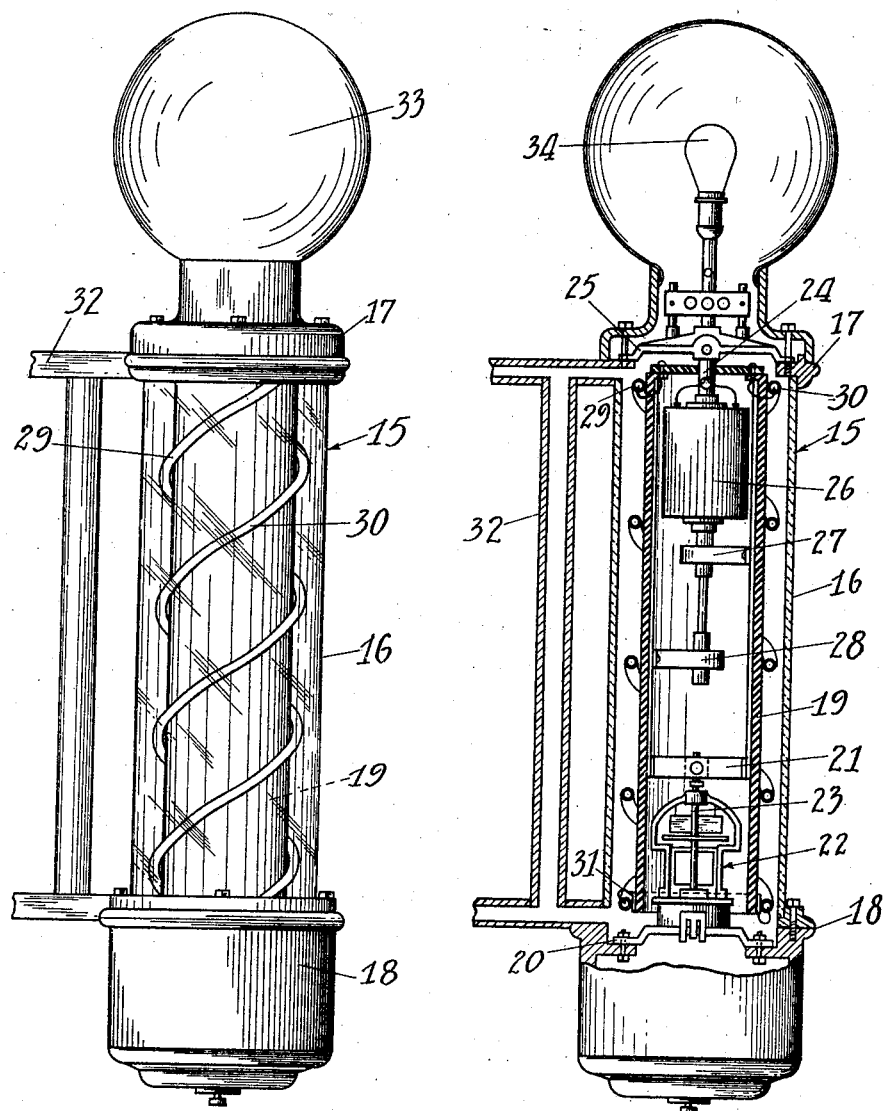
FIG. 1
FIG. 2
FIG. 3
INVENTORS
MORRIS W. BERGER
FRANK H. VIVIAN
BY 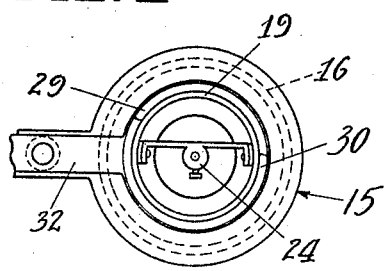
ATTORNEY.

Jan. 17, 1933. M. W. BERGER ET AL 1,894,342
ROTATING NEON ILLUMINATED UNIT FOR BARBER POLES
Filed March 8, 1932 4 Sheets-Sheet 2

INVENTORS
MORRIS W. BERGER
FRANK H. VIVIAN
BY
ATTORNEY.

INVENTORS
MORRIS W. BERGER
FRANK H. VIVIAN
BY
ATTORNEY.

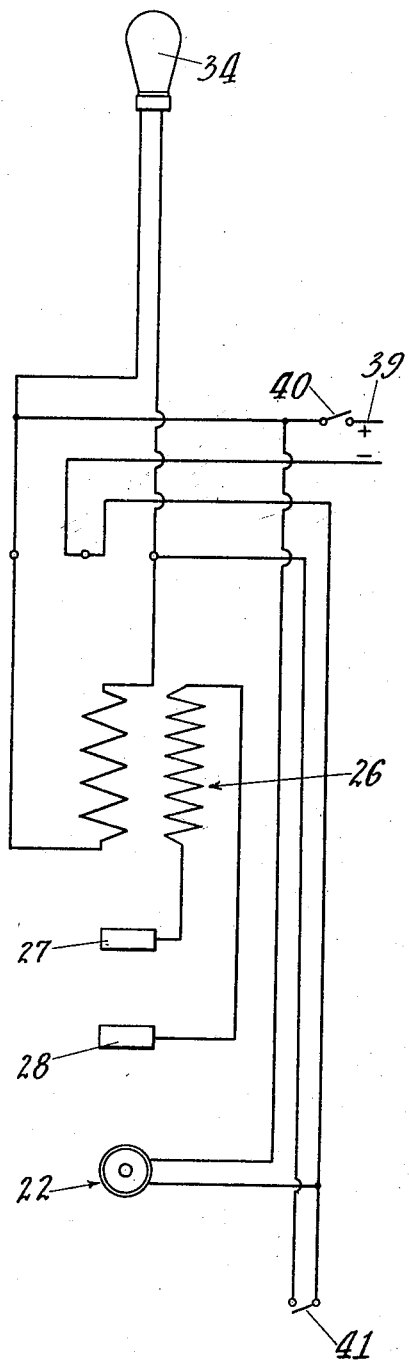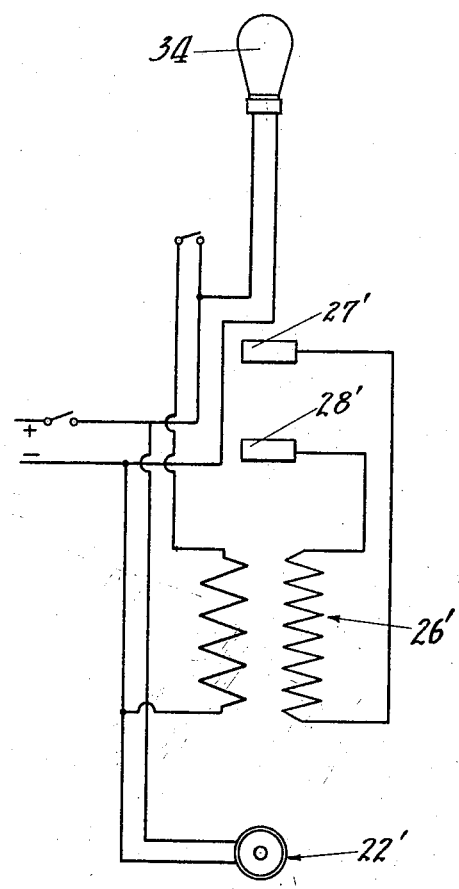

Patented Jan. 17, 1933

1,894,342

UNITED STATES PATENT OFFICE

MORRIS W. BERGER AND FRANK H. VIVIAN, OF SAN FRANCISCO, CALIFORNIA

ROTATING NEON ILLUMINATED UNIT FOR BARBER POLES

Application filed March 8, 1932. Serial No. 597,484.

The present invention relates generally to new and useful improvements in display advertising devices and has particular reference to neon units for barber display advertising.

The instant invention relates particularly to a neon illuminated barber pole which embodies novel mechanical and electrical means for its rotation and illumination and comprises a new and improved system whereby the neon tubes are arranged spirally about a rotating element and consists of alternating colors produced by alternatingly charged tubes employing neon and argon gas.

The usual barber pole of mechanical type employs a revolving illuminated glass cylinder having stripes of red and blue alternately painted thereon but in the instant invention illuminated neon tubes are arranged about a revolving cylinder and means for rotating the same and illuminating the tubes is included in the compact mechanism set forth.

The instant invention is an approved and improved adaption of our copending application Serial No. 557,864, filed August 18th 1931—for rotating neon illuminated units for barber poles.

The primary object of the present invention is the provision of a rotatable neon unit of the class described that is of novel and ornamental construction and that will attract the attention of passersby to the place being advertised.

Another object of the invention is the provision of an advertising display device of the character described that embodies novel electrical and mechanical means for causing the functioning of the various element.

A further object of the invention is the provision of an advertising unit of the class described that may be substituted for the usual type of mechanical unit in present use.

Ancillary to the foregoing objects is that of providing a rotating illuminated sign of the class described that is comparatively simple in construction and operation and that requires a minimum amount of electrical energy for its operation.

A still further object of the invention is to provide a rotating sign of the class described that consists of a novel arrangement of tubes and electrodes and that also includes novel means for making the circuit to and through the spirally wound tubes of the device.

Other objects and advantages of the invention will become apparent with reference to the subjoined specification and the accompanying four sheets of drawings in which:—

Figure 1 is a side elevation of the improved barber pole shown in detached relation;

Figure 2 is a vertical sectional view of the same;

Figure 3 is a detail plan with the top section of the device removed to show the concentric relation of the various elements.

Figure 11 is a wiring diagram illustrating the electrical circuit for the device; and Figure 12 is a wiring diagram illustrating the circuit utilized in the modified form shown in Figure 8.

Figure 4:
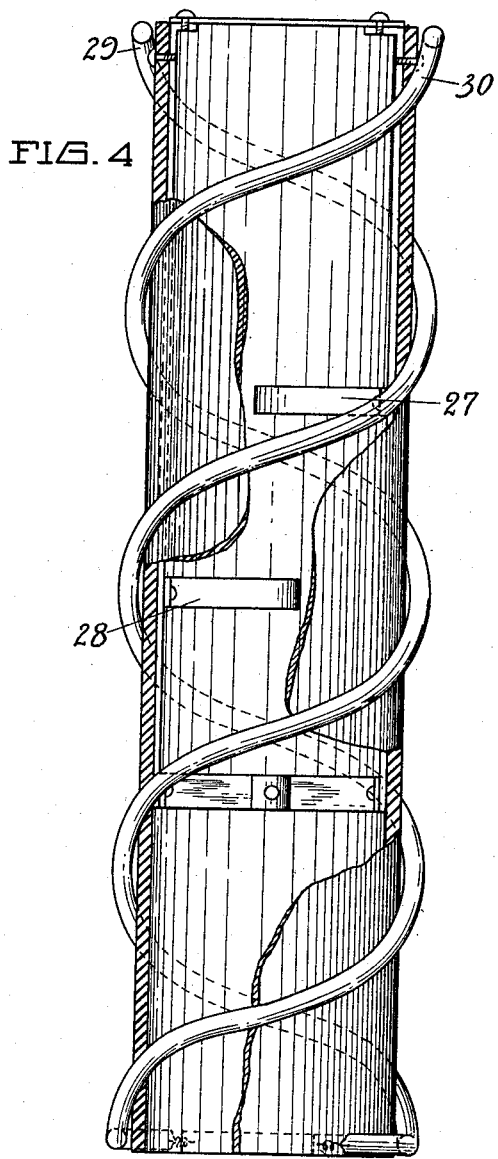
Figure 4 is a vertical fragmentary sectional view of the rotating element carrying the neon tubes.

Referring more particularly to the drawings in which the invention is disclosed and in particular to Figures 1 and 2, the invention comprises generally a casing 15 embodying a cylindrical glass element 16 and cap members 17 and 18, these being of the usual type.

Inside the glass element 16 is concentrically disposed a cylindrical member 19 formed of any non-conducting material such as fibre or the like.

This element, as disclosed in Figure 2, is supported by means of a spider 20 and an internally fixed element 21, the motor 22 being the usual form of meter motor operating at substantially sixty revolutions per minute.

The motor is provided with a shaft 23 which shaft is connected to the element 21 and rotatably supports the element 19 in position within the glass cylinder 16.

The upper end of the element 19 is supported by the spindle 24 mounted in the bearing support 25.

A transformer 26 is supported by the element 25 and is suspended within the rotating element 19 and is provided with rotating contact elements 27 and 28 secured to the inner wall of the cylinder 19, as clearly disclosed in Figure 2.

Figure 5:
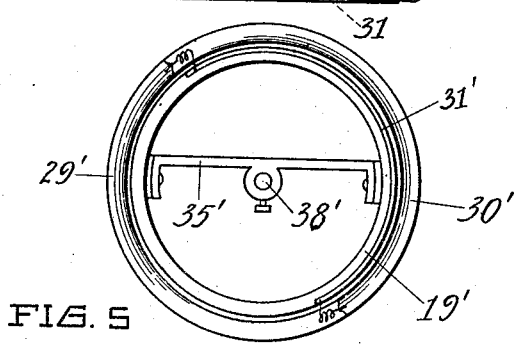
Figure 5 is a bottom plan view of the rotating element showing the connecting band for the lower end of the neon tubes.
Figure 7:
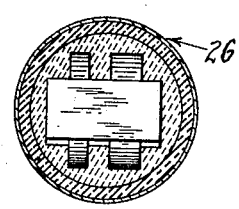
Figure 7 is a transverse sectional detail of the transformer taken on the line 7—7 of Figure 6.

The element 19 is provided with two spirally wound gas tubes 29 and 30 having electrodes at their upper ends and being connected at their lower ends by means of a connecting band 31, Figures 2, 4, and 5.

The housing or case is provided with suitable supporting means 32 and the upper section thereof is provided with the usual globe 33 illuminated by the electric bulb 34.

Referring now more particularly to the modified form shown in Figures 8, 9 and 10 it will be observed that the transformer 26' is arranged differently than in Figures 1, 2 and 6 that is the motor 22' is combined with the transformer and the contact brushes 27' and 28' are positioned above the transformer instead of below, as clearly disclosed in Figure 2.

Figure 8:
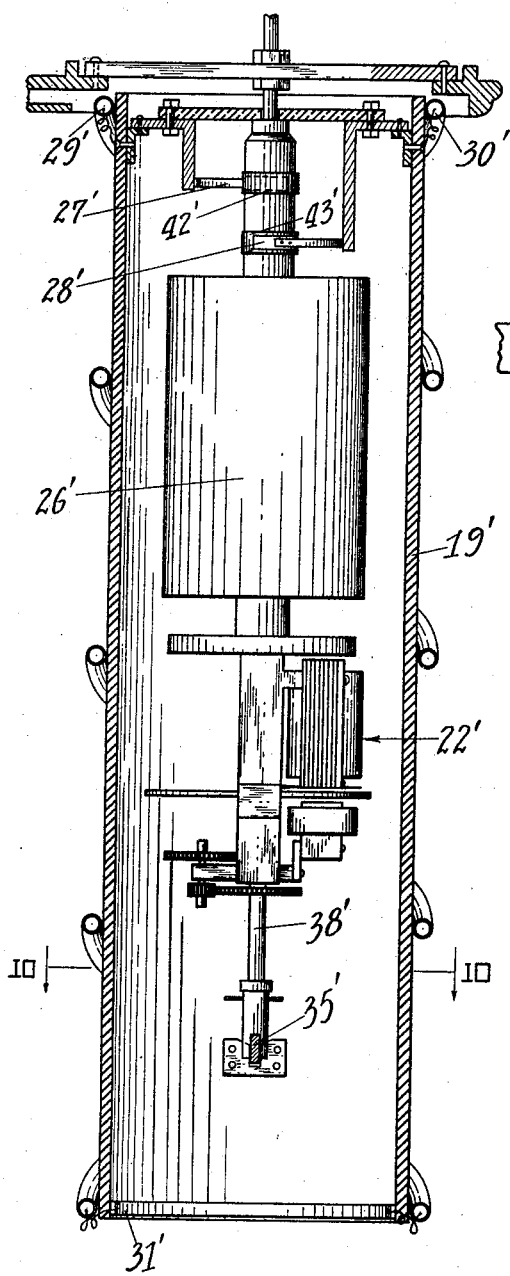
Figure 8 is a modified form illustrating a modified mounting for the transformer.
Figure 9:
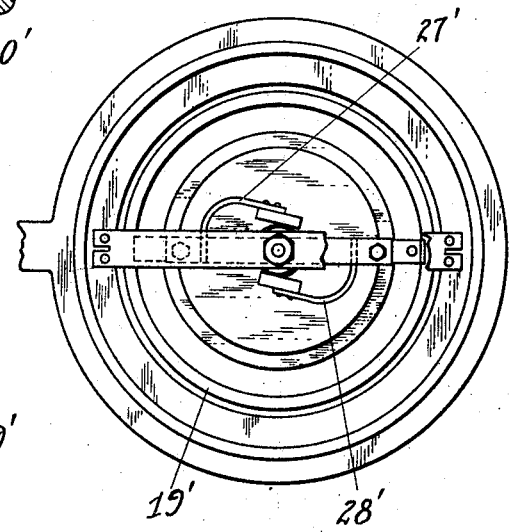
Figure 9 is a plan view illustrating the brush connections to the transformer, as disclosed in the modified form in Figure 8.
Figure 10:
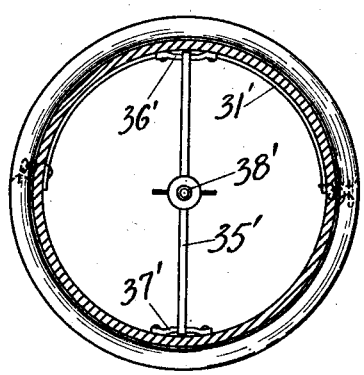
Figure 10 is a transverse section taken on the line 10—10 in Figure 8.

As shown in Figures 2, 6, 7 and 8 the driving unit including the transformer 26' and the motor 22' are connected to the element 19 by means of a transversely disposed key 35' adapted to fit into slotted plates 36' and 37', as indicated in Figures 8 and 10, said key 35' being mounted upon the motor driving shaft 38', as shown in Figure 8.

Figure 6:
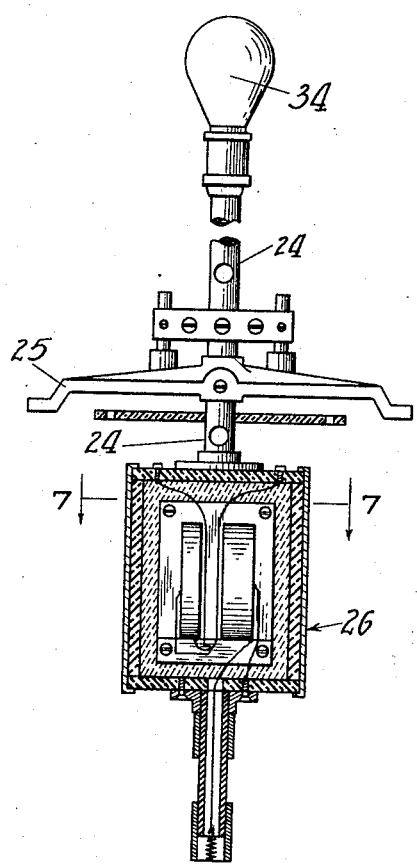
Figure 6 is a sectional detail partly in elevation illustrating the transformer and associated mechanism per se.

Referring now in particular to Figures 11 and 12 of the drawings in which wiring diagrams have been shown it will be noted that with especial reference to Figure 11, which shows the wiring diagram illustrated in Figures 1, 2 and 6 that the line circuit 39 connecting the transformer 26 and including the motor 22, brushes 27 and 28, also the light 34 and switches 40 and 41 coact to drive the motor and supply electrical energy to the neon tubes 29 and 30 or 29' and 30', so that the element 19 or 19' are rotated and the neon tubes are illuminated in two distinct colors.

In the modified form shown in Figures 8 and 12 the brushes 27' and 28' are merely arranged above the transformer 26' and operate in conjunction with the contact sleeves 42' and 43', clearly shown in Figure 8.

It will be observed in this connection that electrical energy passing through the transformer is stepped up to the required degree for the illumination of the neon tubes while the driving motor circuit is entirely distinct from the illuminating circuit, as disclosed in Figures 11 and 12.

It will be obvious with reference to Figures 1, 2 and 4 and to the modified form shown in Figure 8 that the cylindrical element 19, tubes 29 and 30 may be readily inserted as a unit in any rotating barber pole and that the transformer and motor elements may be also readily inserted into the element 19 due to the members 35', 36', 37' and 38'.

What we claim and desire to secure by Letters Patent of the United States Patent Office is the following in which:—

1. In a device of the class described, a spider provided with a boss having a hole centrally therethrough for the accommodation of a tube, said tube having a light socket on its upper end and a transformer carried pendently from its lower end, said transformer having wiping contacts adapted to convey the electrical energy to a multiple of gas-charged tubes spirally wound about said cylindrical member.

2. In a device of the class described, a revolubly mounted hollow cylindrical member of fibre material, in combination with a fixedly mounted transformer about which it is adapted for rotation, a multiple of gas-charged tubes spirally wound about said cylindrical member, secured thereto and provided with sealed extremities, diametrically opposed and vertically extending electric conveyors borne internally by said member, said conveyors being provided respectively with spaced apart centrally extending wiping contacts adapted respectively for contacting the contacts of said transformer, an electric circuit leading from a source of electric energy to and through said transformer and said wiping contacts and conveyors, thence to and through the said sealed extremities of said tubes to their interiors.

3. In a device of the class described, a revolubly mounted hollow cylindrical member of fibre material, in combination with a fixedly mounted transformer about which it is adapted for rotation, a multiple of gas-charged tubes spirally wound about said cylindrical member, secured thereto and provided with sealed extremities, diametrically opposed and vertically extending electric conveyors borne internally by said member, said conveyors being provided respectively with spaced apart centrally extending wiping contacts adapted respectively for contacting the contacts of said transformer, an electric circuit leading from a source of electric energy to and through said transformer and said wiping contacts and electric conveyors, thence to and through the said sealed extremities of said tubes to their interiors, and a switch in said circuit adapted for making and breaking said electric circuit.

4. In a device of the class described, a hollow revolubly mounted cylinder of insulating material, a fixed transformer about which said cylinder is adapted to rotate, inert-gas-charged tubes encircling said cylinder in spiral formation and secured thereto, means for the electrification of said inert-gas charges to cause their illumination, and means for the rotation of said cylinder.

5. In a device of the class described, a hollow revoluble cylinder, means for revolubly supporting said cylinder, a fixedly suspended transformer within said cylinder, inert-gas-charged tubes having sealed extremities encircling said cylinder spirally, longitudinally extending current conveying means of opposite disposition carried interiorly of the said cylinder, spaced apart wiping contacts borne by said current conveying means, said wiping contacts being adapted for respectively contacting contacts borne by said transformer, means connecting said current conveying means with the extremities of said gas-charged tubes to cause the illumination of said tubes, and means for the rotation of said cylinder.

6. In a revoluble illuminated unit of the class described, the combination with a fixed hollow cylindrical glass member fixedly mounted and constituting a housing, of a revoluble neon illuminated member constituting a unit mounted therewithin, comprising a cylindrical member of insulating material bearing upon its exterior surface a pair of spirally-formed inert-gas-charged tubes provided at their extremities with electrodes, a transformer and a motor mounted interiorly of the said revoluble member, oppositely disposed current conveying elements borne by said revoluble member, spring wiping contacts secured to the current conveying elements and adapted to contact respectively with the terminals of said transformer, means for conveying electric current from said current conveying means to said gas-charges, an upper and a lower spider provided with a tubular connecting member and adapted for the support of said glass member, a hollow globular glass member provided interiorly with an illuminating means and supported by a means borne by said upper spider, an electric circuit leading from a source of electric energy and adapted to energize said illuminating means, said gas charges through the agency of said transformer and said electrodes, and the said motor for its actuation, and means for making and breaking said circuit.

7. In a device of the class described, a supporting means comprising an upper and a lower spider united by a tubular standard, the upper spider being provided with means for securing in suspended and fixed relation a transformer and serving also as a support for electric wiring and an electric bulb and its socket, the lower spider having provisions for the mounting thereon of an electric motor.

8. In an electric circuit, in a device of the class described, a fixedly suspended cylindrical transformer having downwardly extending terminals, vertically arranged circuit conveying bars of opposite disposition and connected at their upper and lower extremities by insulating means, horizontally arranged wiping contacts secured to said bars adapted for wiping engagement respectively with said terminals, spirally arranged inert-gas-charged tubes, means for electrically connecting said tubes with said bars, and means for conveying current to said transformer from a source of electric energy.

In testimony whereof, we hereunto affix our signatures.

MORRIS W. BERGER.
FRANK H. VIVIAN.